C. A. DEUSCHER.
HORSE OVERSHOE.
APPLICATION FILED APR. 4, 1913.
1,093,547.
Patented Apr. 14, 1914.
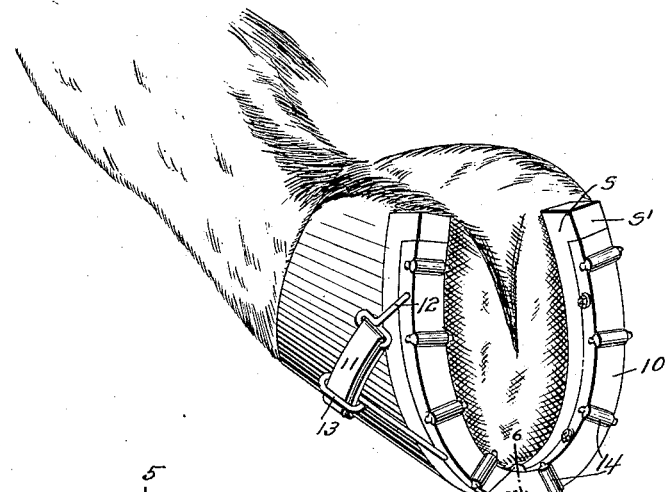
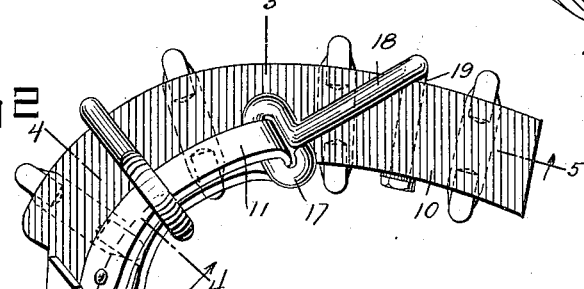
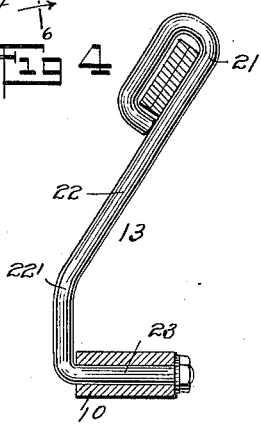
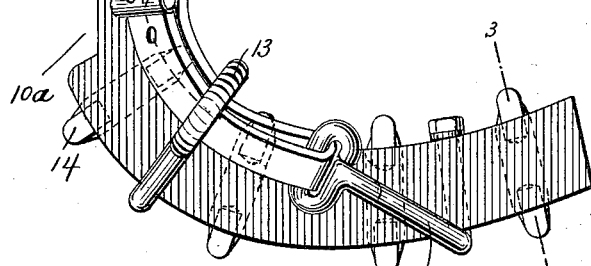
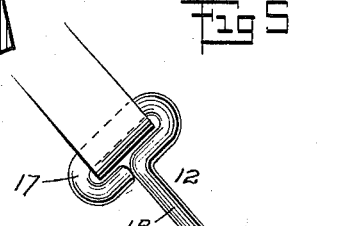
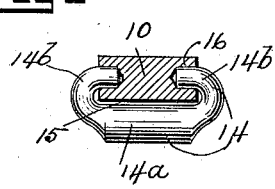
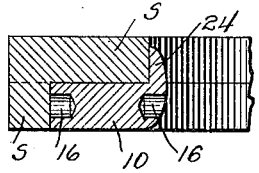
WITNESSES
C. J. Hachenberg.
Geo. N. Beeler
INVENTOR
Charles A. Deuscher
BY Munn & Co
ATTORNEYS
COLUMBIA PLANOGRAPH CO., WASHINGTON, D. C.

UNITED STATES PATENT OFFICE.

CHARLES A. DEUSCHER, OF NEW YORK, N. Y., ASSIGNOR OF ONE-THIRD TO JEREMIAH J. LYONS, OF NEW YORK, N. Y.

HORSE-OVERSHOE.

1,093,547. Specification of Letters Patent. Patented Apr. 14, 1914.

Application filed April 4, 1913. Serial No. 758,830.

*To all whom it may concern:*

Be it known that I, CHARLES A. DEUSCHER, a citizen of the United States, and a resident of the city of New York, borough of the Bronx, in the county and State of New York, have invented a new and Improved Horse-Overshoe, of which the following is a full, clear, and exact description.

This invention relates to farriery, and has particular reference to devices intended to be temporarily attached or secured to horses' hoofs during icy or slippery weather.

Among the objects of this invention is to provide a device of the character indicated which is adapted to be easily attached to or removed from the hoof and which is provided with gripping devices of peculiar construction adapting them in a superior degree to the making of a sure hold upon the ice and which may be readily replaced if worn out or broken.

The foregoing and other objects of this invention will hereinafter be more fully described and claimed and illustrated in the drawings forming a part of this specification in which like characters of reference indicate corresponding parts in all the views, and in which—

Figure 1 is a perspective view of a horse's hoof with an overshoe secured thereto; Fig. 2 is a plan view of the overshoe complete but detached from the hoof; Fig. 3 is a transverse section on the line 3—3 of Fig. 2; Figs. 4 and 5 are similar views on corresponding lines of Fig. 2; and Fig. 6 is a detail on the line 6—6 of Fig. 1.

The several parts of this overshoe may be made of any suitable materials, and the relative sizes and proportions thereof may be varied to a considerable extent without departing from the spirit of the invention hereinafter claimed.

Referring more particularly to the drawings, it will be understood that the device comprises primarily a metallic plate or shoe 10 adapted to be detachably clamped upon the usual shoe S by means of a strap 11 and a plurality of hangers 12 and 13. As shown especially in Figs. 1 and 2, the plate 10 conforms substantially to the shoe S which may or may not have calks $s$ and $s'$.

The grippers which I prefer are loosely pivoted members or links 14 arranged as shown in Figs. 3 and 5, and each comprises a substantially cylindrical body $14^a$ and pintles $14^b$ extending toward each other into the edges of the plate 10. Each body $14^a$ is preferably of larger diameter than its pintles $14^b$ and is roughened or corrugated on the lower surface to increase the grip, as indicated at $14^c$. Under normal circumstances, however, the grippers arranged as shown in Figs. 1 and 2 do not require any special roughening to accomplish their purpose. It will be noted that there is provided a slight space 15 between the bottom of the plate 10 and the bodies $14^a$ of the grippers whereby there is a certain amount of free pivotal or swinging action permitted of the grippers. The pintles are preferably formed with their axes eccentric to the axis of the body $14^a$, whereby the strength and durability of the grippers are of the maximum with respect to the weight thereof. Should any of the grippers become broken or worn, they may be readily removed and others replaced by the use of a suitable tool causing one or both of the pintles to be forced into the respective sockets 16.

Each hanger consists of a loop, a stem, and a shank pivoted horizontally in the plate 10. More specifically, each hanger 12 includes a loop 17 in the plane of and at right angles to the stem 18, and a shank 19 formed at right angles to the stem and pivoted in a bearing 20 in the plate 10. Each hanger 13 comprises a loop 21 in the plane of and parallel to the stem 22. The shank 23 is journaled in the plate 10 in a manner similar to the shanks 19 above described, but the stem 22 is provided with a slight angle 22' intermediate the loop 21 and the shank 23 so as to better conform to the shoe S and the front of the hoof.

I prefer to attach the strap 11 as shown in Fig. 2, the buckle being arranged at the front of the hoof, and the loose end of the strap being passed through one of the loops 21, thence through the loop 17 of one of the heel hangers 12, thence returning parallel to itself through the first mentioned loop, thence around the other side of the hoof in a similar manner, and back to the buckle. By properly arranging and proportioning the several hangers, the single strap 11 suffices to secure the overshoe reliably in place. It is apparent, therefore, that it may be easily and quickly attached and detached.

The front of the plate 10 may be cut out as indicated at $10^a$, or flattened for coöp- eration with the toe calk *s* of the shoe S so that if the usual shoe has such calk, the application of the overshoe will not be interfered with. Whether or not the toe calk *s* is present, the plate 10 is preferably provided with an upwardly projecting lug 24 which engages just back of the toe portion of the usual shoe as shown especially in Fig. 6, and hence prevents forward displacement of the overshoe. Rearward and lateral displacements of the overshoe are prevented by the hangers and strap whether the calks *s'* be present or not. As shown also in Fig. 6, the center of the toe portion of the overshoe is preferably provided with sockets 16 for the application of a central toe gripper in case the toe calk *s* is not present. It is to be observed in this connection also that with the use of my device provided for, the horses need not be shod ordinarily with shoes having calks. When the streets or roads are slippery, the overshoes may be readily applied as above indicated, and without the usual shoe calks the horses' feet have a more rigid and flatter engagement with the pavement than is possible with high calks or with overshoes commonly used. The arrangement of the grippers indicated herein on my overshoes provides for a broad firm base or footing for the horses.

Having thus described my invention, I claim as new and desire to secure by Letters Patent:—

In a horse overshoe, the combination of a plate adapted to conform to the usual shoe, a plurality of grippers in the form of links pivotally connected to said plate and extending below the same, each of said grippers consisting of a body and end pintles extending therefrom and bent toward each other within the plate, and means to secure the plate to the hoof.

In testimony whereof I have signed my name to this specification in the presence of two subscribing witnesses.

CHARLES A. DEUSCHER.

Witnesses:
 GEO. L. BEELER,
 JEREMIAH J. LYONS.

---

Copies of this patent may be obtained for five cents each, by addressing the "Commissioner of Patents, Washington, D. C."